United States Patent [19]

Lin

[11] 4,421,159
[45] Dec. 20, 1983

[54] HEAT-DISSIPATING DEVICE OPERATED BY SOLAR ENERGY

[76] Inventor: Shao C. Lin, 47-3, Section 2, Keelung Rd., Taipei, Taiwan

[21] Appl. No.: 345,065

[22] Filed: Feb. 2, 1982

[51] Int. Cl.³ .............................................. B60H 3/00
[52] U.S. Cl. ................................. 165/44; 237/12.3 A; 98/2.05; 126/417; 165/41
[58] Field of Search ...................... 165/41, 42, 43, 44, 165/45, 129; 237/12.3 A, 12.3 C; 98/2.14, 43 R, 43 C, 70; 126/417

[56] References Cited

U.S. PATENT DOCUMENTS

| | | | |
|---|---|---|---|
| 1,539,534 | 5/1925 | Ansell | 98/2.14 |
| 1,550,503 | 8/1925 | Coffman | 98/2.14 |
| 1,861,286 | 5/1932 | Royle | 98/2.14 |
| 2,172,939 | 9/1939 | Lintern et al. | 98/2.14 |
| 4,085,667 | 4/1978 | Christianson | 126/417 |

Primary Examiner—William R. Cline
Assistant Examiner—John F. McNally
Attorney, Agent, or Firm—Hauke and Patalidis

[57] ABSTRACT

This invention relates to a device using solar energy to cause a "chimney effect" to cool and refresh the interior atmosphere of a building or a vehicle. The invention further provides a modification which takes advantage of the exhaust heat of an engine so that it can operate during the night or in sunless days.

8 Claims, 2 Drawing Figures

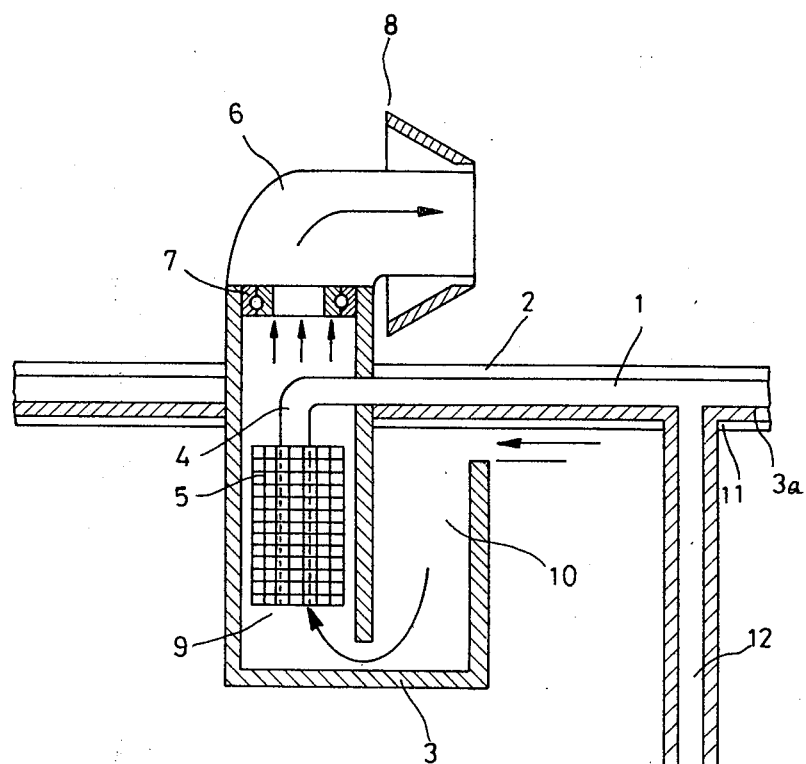
F I G. 2

HEAT-DISSIPATING DEVICE OPERATED BY SOLAR ENERGY

This invention relates to a heat-dissipating apparatus, which is completely energized by solar energy to draw cool air into and exhaust hot air from an enclosure by means of a "chimney effect".

It is an object of this invention to provide a movable outlet of hot air which always faces opposite to the wind direction so as to prevent the wind from blowing into the outlet and blocking the outflow of hot air.

It is further object of this invention to provide an accessory device which enables the heat-dissipating apparatus to work when solar heat is not available, such as is the case in rainy, cloudy days, or during the night by putting to use the exhaust heat of vehicles.

This invention will be more clearly understood from the following detailed description of preferred embodiments thereof which is made, by way of example, with reference to the accompanying diagrammatic drawings in which like numerals designate like parts:

BRIEF DESCRIPTION OF THE DRAWING

FIG. 2 is a view similar to FIG. 1 showing a modification provided with means for taking advantage of exhaust heat.

DETAILED DESCRIPTION OF THE PREFERRED EMBODIMENTS

Figure 1:
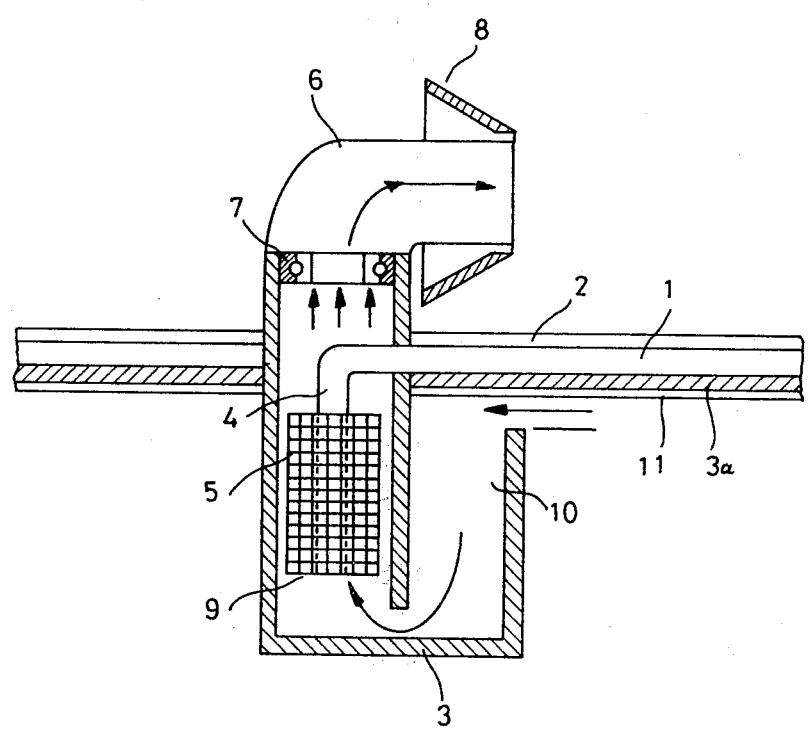
FIG. 1 is a schematic sectional view of a preferred embodiment of this invention.

With reference to FIG. 1, the roof of a building (or the top of a car) 11 is provided with a heat collecting aluminum plate 1 for transferring the absorbed solar energy through a heat-conducting aluminum rod 4 connected between the plate 1 and a heat-dissipating tube 9, where the heat is radiated by means of heat-dissipating gauze or fins 5. The hot air rises in an enclosure up to a rotatable outlet 6 and is exhausted therefrom. In so doing, cool air is constantly introduced into the enclosure 3 to replace the exhausted hot air, thereby achieving a "chimney effect" which results in an energy saving air conditioner. The heat collecting aluminum plate 1 is covered by a transparent plastic panel 2 to isolate it from direct exposure to the atmosphere to avoid heat loss. A heat insulating layer 3a is disposed below the plate 1. In order to allow orientation of the outlet 6, there is provided a highly efficient bearing 7 disposed between the outlet 6 and the heat-dissipating pipe 9. For the purpose of more rapidly adjusting the orientation of the outlet 6 in response to the change of direction of the wind, or of a vehicle, there is further provided a wind cup 8 which enables the rotatable outlet 6 to receive more impact from the wind to accelerate its rotation. In so doing, the outlet 6 is always facing opposite the wind direction to avoid back flow caused by the wind through the heat-dissipating pipes which would reduce the efficiency of heat removal therein. The inlet of the air flow path, or inlet of the enclosure 3, is located in the interior of a building or a vehicle, thereby removing the relatively foul air, and replacing it with cool, fresh air from the ambient atmosphere.

When applied to vehicles instead of buildings, a modification of this invention is as shown in FIG. 2, which takes advantage of the exhaust heat of the engine as its energy source, and enables the "chimney effect" to take place in whatever rainy or cloudy days, or during the night. In the structure of FIG. 2, a metallic pipe 12 having good heat conductivity bridges or interconnects the heat collecting aluminum plate 1 and heat conducting rod 4 and the site of heat exchange in the path of the exhaust pipe of the vehicle, preferably the exhaust manifold 13 of the engine. The metallic pipe 12 is externally enclosed by heat-insulating material, to prevent heat loss, and at its bottom end where it joints the manifold 13 it forms a metallic sleeve 14 to enhance the heat exchange between it and the exhausted gas. Even in sunny days, the energy provided by the exhaust heat may co-operate with the solar energy.

I claim:

1. A cooling device installed on the top of an enclosure said device comprising: a heat-collecting metallic plate overlaying the top of said enclosure, a transparent panel superimposed over said metallic plate, an inslating layer lying beneath said metallic plate, an air path having an inlet at the interior of said enclosure and a rotatable outlet, heat-radiating means located in said air path and a metallic rod interconnecting said metallic plate and said heat-radiating means, said air path being such that cool air entering through said inlet is heated by said heat-radiating means and exhausted through said rotatable outlet, wherein said rotatable outlet is elbow shaped and has an end vertically and rotatably mounted and an other end horizontally oriented.

2. The device according to claim 1, wherein said horizontally oriented end of said outlet is provided with a wind-orienting member.

3. The device according to claim 2, wherein said enclosure is a vehicle having an engine and an exhaust manifold for said engine, said device further comprising heat exchanging means connected to the exhaust manifold of the engine of said vehicle, and a metallic conduit interconnecting said heat exchanging means with said metallic plate.

4. The device according to claim 2, wherein said enclosure is a vehicle having an engine and an exhaust manifold for said engine, said device further comprising heat exchanging means connected to the exhaust manifold of the engine of said vehicle, and a metallic conduit interconnecting said heat exchanging means with said metallic rod.

5. The device according to claim 2, wherein said enclosure is a building.

6. The device according to claim 1, where said enclosure is a vehicle having an engine and an exhaust manifold for said engine, said device further comprising when installed on the top of a vehicle, means comprising: heat exchanging means connected to the exhaust manifold of the engine of said vehicle, and a metallic conduit interconnecting said heat exchanging means with said metallic plate.

7. The device according to claim 1 wherein said enclosure is a vehicle having an engine and an exhaust manifold for said engine, said device further comprising heat exchanging means connected to the exhaust manifold of the engine of said vehicle, and a metallic conduit interconnecting said heat exchanging means with said metallic rod.

8. The device according to claim 1, wherein said enclosure is a building.

* * * * *